(No Model.)

M. T. WALLACE & A. H. REYNOLDS.
NUT LOCK.

No. 592,845. Patented Nov. 2, 1897.

Witnesses
F. W. Woerner
L. A. McIntire

Inventors;
M. T. Wallace
and A. H. Reynolds
By Joseph H. Milton
Attorney.

THE NORRIS PETERS CO., PHOTO-LITHO., WASHINGTON, D. C.

UNITED STATES PATENT OFFICE.

MERRITT TACITUS WALLACE, OF NEW LEXINGTON, AND ALEXANDER H. REYNOLDS, OF MOXAHALA, OHIO.

NUT-LOCK.

SPECIFICATION forming part of Letters Patent No. 592,845, dated November 2, 1897.

Application filed March 22, 1897. Serial No. 628,790. (No model.)

*To all whom it may concern:*

Be it known that we, MERRITT TACITUS WALLACE, of New Lexington, and ALEXANDER H. REYNOLDS, of Moxahala, Perry county, Ohio, citizens of the United States, have invented certain new and useful Improvements in Nut-Locks; and we do hereby declare the following to be a full, clear, and exact description of the invention, such as will enable others skilled in the art to which it appertains to make and use the same.

This invention relates to improvements in nut-locks, and has for its object the construction of means whereby the unscrewing or working of the nut off of its bolt due to the jar and vibration incident to use will be prevented in a simple and inexpensive manner.

We accomplish the objects of the invention by means of the mechanism illustrated in the accompanying drawings, in which—

Figure 1:
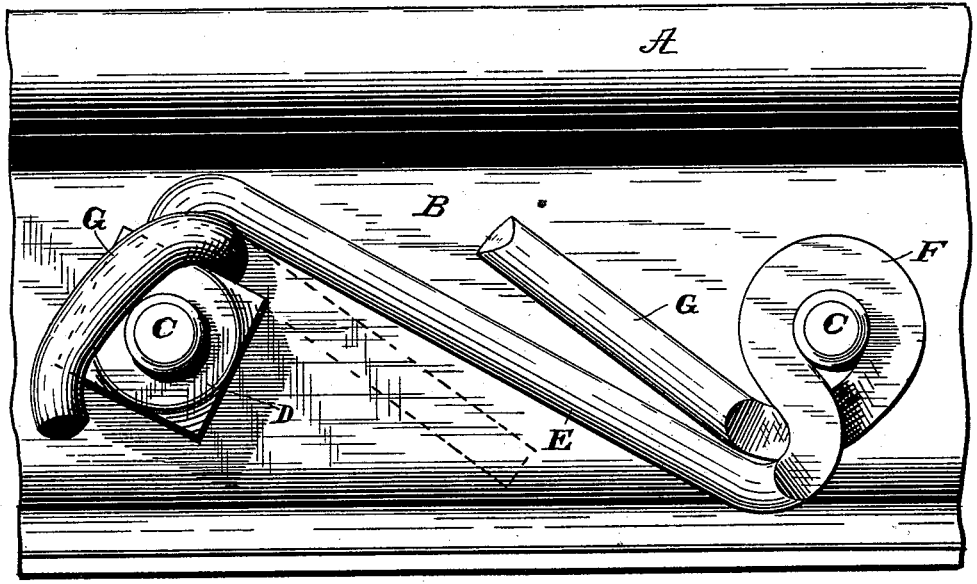
Figure 2:
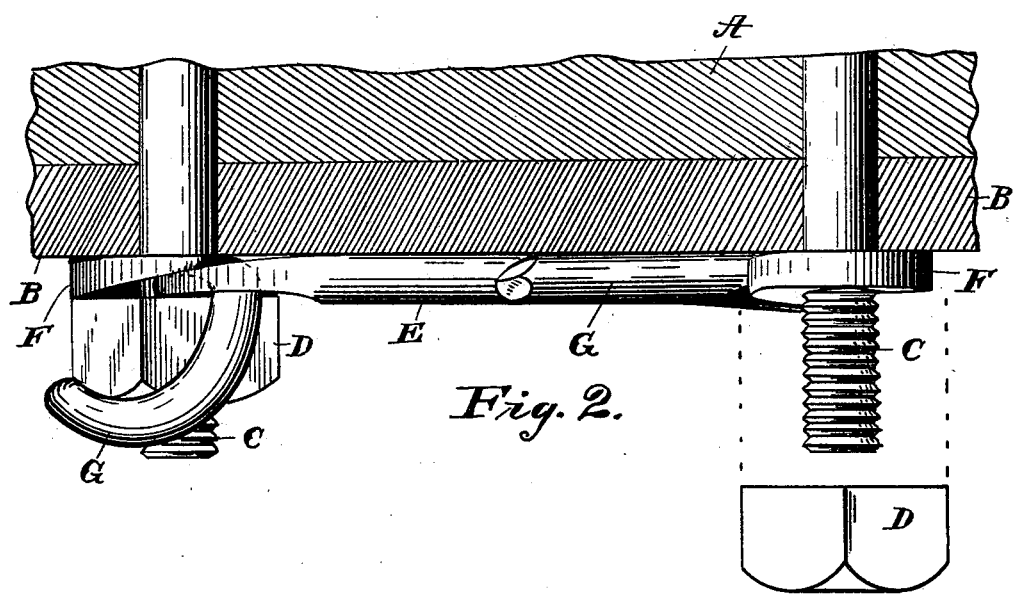

Figure 1 is a view in side elevation of our improved nut-lock, showing its application to nuts used in railroad-rail joints, the view showing parts of a rail and fish-plate and showing one nut in place and locked and a bolt without the nut, but with the lock in position on the bolts; Fig. 2, a detail in horizontal section of the railroad-rail and one of the fish-plates and showing the bolts and nut-lock in plan view. One of the nuts is screwed into place and locked and the other nut is off of the bolt.

Similar letters of reference indicate like parts throughout both views of the drawings.

A represents a railroad-rail; B, the fish-plate to connect the abutting ends of the rails; C, the bolts which pass transversely through the rails and the fish-plates on each side of the rails, and D the nuts which screw onto the threaded ends of the bolts, all of which parts are and may be of any usual construction.

Our nut-lock consists of the body part E, having on its ends the loops F, which stand out laterally and in opposite directions from the body part E. The material from which the lock is made will preferably be wire of suitable diameter, depending on the size of the nuts to be held and the strain to be resisted, and the ends of the wire after leaving the loops will occupy a return position alongside of the body E until after the nuts are screwed down into place. The openings in the loops will be large enough to allow a bolt to be projected through the said opening in the manner as clearly shown in the drawings. The nut-lock is made to connect two bolts and is placed in position on the bolts before the nuts are screwed onto same. In order that the surface under the nut may be as near level as possible and thereby afford a good seat for the nut, the wire will be flattened, as shown, and the wire used will consequently be large enough in diameter to permit of this flattening.

After the nuts are screwed down firmly into place the end G nearest to each of the nuts will be bent upwardly against the side of the nut and then over the top of the nut and around the projecting end of the bolt. Fig. 1 shows an end bent over one of the nuts in the manner just described, the position before the bend was made being shown by the dotted lines.

When one of the ends of the wire is bent around a nut, as above described, it makes a positive bar or stop for the nut, which no amount of jarring or wrenching on either the bolt or nut can change until the end is bent back into the position which it had when the nut was screwed on.

We have shown the nut-lock as applied to a rail-joint because it is particularly well adapted to that use, but we do not wish to limit the application of the device to use on rail-joints, nor to any specified adaptation of same; but What we do claim as new, and wish to secure by Letters Patent of the United States, is—

1. A nut-lock made out of a wire rod and comprising a straight bar forming a body portion, lateral loops formed by making a return-bend at both ends of the body portion, then bending the ends outwardly and approximately in a circular direction to intersection at the first bend, and after the bolt and nut are in position, bending the ends up alongside of and thence across the top of the nut, substantially as described and specified.

2. In a nut-lock made out of a metal rod of suitable diameter, the body portion E, terminating at each end with the lateral loops F, on opposite sides of the body part, the said loops being flattened as shown to provide a seat for the nuts and the ends G projected beyond the intersection of the loops and adapted to be bent up and over the nut for the purposes specified.

In testimony whereof we affix our signatures in presence of two witnesses.

MERRITT TACITUS WALLACE.
ALEXANDER H. REYNOLDS.

Witnesses:
W. H. H. MINTURN,
A. L. MADDEN.